(12) United States Patent
Salman et al.

(10) Patent No.: US 7,202,802 B2
(45) Date of Patent: Apr. 10, 2007

(54) REDUCED KEYPAD

(75) Inventors: Majeed D. Salman, Redmond, WA (US); G. Eric Engstrom, Kirkland, WA (US)

(73) Assignee: Wildseed Ltd., Seattle, WA (US)

( * ) Notice: Subject to any disclaimer, the term of this patent is extended or adjusted under 35 U.S.C. 154(b) by 45 days.

(21) Appl. No.: 11/060,713

(22) Filed: Feb. 17, 2005

(65) Prior Publication Data

US 2005/0237228 A1    Oct. 27, 2005

Related U.S. Application Data

(60) Provisional application No. 60/566,676, filed on Apr. 30, 2004, provisional application No. 60/567,214, filed on Apr. 30, 2004, provisional application No. 60/566,704, filed on Apr. 30, 2004, provisional application No. 60/565,638, filed on Apr. 27, 2004.

(51) Int. Cl.
*H03M 11/00* (2006.01)
*H03K 17/94* (2006.01)

(52) U.S. Cl. ............... 341/22; 341/28; 341/34; 345/168; 345/171

(58) Field of Classification Search .......... 341/21, 341/22, 23, 28; 345/168, 172; 400/486; 379/433.07; 200/5 A, 516
See application file for complete search history.

(56) References Cited

U.S. PATENT DOCUMENTS

| | | | | |
|---|---|---|---|---|
| 5,660,488 | A | * | 8/1997 | Miller .................. 400/486 |
| 5,673,256 | A | * | 9/1997 | Maine .................. 370/271 |
| 6,275,216 | B1 | * | 8/2001 | Kitamura .............. 345/171 |
| 6,295,052 | B1 | * | 9/2001 | Kato et al. ........... 345/179 |
| 6,885,318 | B2 | * | 4/2005 | Bickerton ............. 341/22 |
| 2003/0227745 | A1 | * | 12/2003 | Khoo .................. 361/686 |
| 2004/0027335 | A1 | * | 2/2004 | Lin .................... 345/168 |

\* cited by examiner

*Primary Examiner*—Jeffery Hofsass
*Assistant Examiner*—Sisay Yacob
(74) *Attorney, Agent, or Firm*—Schwabe, Williamson & Wyatt, P.C.

(57) ABSTRACT

An apparatus is provided with a first plurality of input keys. Each of the first plurality of input keys is associated with at least one numeric value and at least one alphabetic value and arranged in a numeric and first alphabetic telephone keypad arrangement. The apparatus is also provided with a second plurality of input keys that are at least partially surrounding the first plurality of input keys. At least some of the second plurality of input keys are associated with at least one alphabetic value. Further, input keys of the first and the second plurality of input keys are arranged relative to each other to form a second alphabetic arrangement.

28 Claims, 8 Drawing Sheets

REDUCED KEYPAD

RELATED APPLICATIONS

This application claims the benefit of priority from Provisional Application Ser. No. 60/565,638 filed Apr. 27, 2004, Provisional Application Ser. No. 60/566,676 filed Apr. 30, 2004, Provisional Application Ser. No. 60/567,214 filed Apr. 30, 2004, and Provisional Application Ser. No. 60/566,704, filed Apr. 30, 2004, all of which applications are fully incorporated herein by reference.

TECHNICAL FIELD

The present disclosure is related to the field of electronic device user interfaces. More specifically, but not exclusively, the present disclosure relates to the design of input mechanisms for use in mobile electronic devices.

BACKGROUND INFORMATION

Mobile electronic devices have become ubiquitous in today's fast paced society. Various portable or mobile handheld devices can perform multiple tasks as well as provide multiple communication systems. For example, the personal digital assistant ("PDA") cellular telephone, in addition to serving as a personal organizer and cellular phone, may also provide text messaging, paging, and Internet connectivity. Accordingly, most devices require an interface for entering alphabetic as well as numeric characters. Providing a user-friendly interface, however, can be a challenge for manufacturers because of the limited surface area available on most handheld devices.

Traditional, non-portable electronic devices including computers and other devices that reside in a wall rack or on a desktop have generally contained a terminal and an input keyboard having a layout such as a QWERTY keyboard, a keyboard that gained its name from the first six letters of the top row that spell "QWERTY". Most users are familiar with the QWERTY layout and many mobile electronic devices have a miniaturized QWERTY keyboard. Use of keys on a miniaturized QWERTY keyboard, however, can be difficult due to reduced key size and spacing.

Other mobile devices, such as a simple cellular telephone, may include only a conventional 12-key telephone keypad, having 10 keys associated with the numeric values 0–9 and two additional keys associated with an asterisk and pound symbol. Several methods have evolved for entering text on the telephone keypad, such as for example, multi-tap or predictive text entry (e.g., T9 Text Input™ by America Online, Inc., of Dulles, Va.). Despite such methods, entering alphabetic characters via a typical 12-key telephone keypad may remain inefficient for users because the telephone keypad is not designed for text entry.

DETAILED DESCRIPTION

Embodiments of the present invention include, but are not limited to, a reduced keypad for a mobile electronic device and apparatuses including the same.

Parts of the description will be presented in terms such as portable or mobile electronic devices. As well understood by those skilled in the art, the term "portable/mobile electronic device" as used herein (hereafter, simply "electronic device"), including in the claims, comprise wireless mobile phones, PDAs, and the like.

The term "wireless mobile phone" as used herein refers to the class of telephone devices equipped to enable a user to make and receive calls wirelessly, notwithstanding the user's movement, as long as the user is within the communication reach of a service or base station of a wireless network service provider. Unless specifically excluded, the term "wireless mobile phone" is to include the analog subclass as well as the digital subclass (of all signaling protocols).

In the following description, various aspects of the illustrative embodiments will be described. It will be apparent, however, to those skilled in the art that alternate embodiments of the present invention may be practiced with all or only some aspects of the present invention. For purposes of explanation, specific numbers, materials and configurations are set forth in order to provide a thorough understanding of the described embodiments. However, it will be apparent to one skilled in the art that alternate embodiments of the present invention may be practiced without the specific details. In other instances, well-known features are omitted or simplified in order not to obscure the illustrative embodiments.

Various operations will be described as multiple discrete steps, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

The embodiments are described herein with respect to a character set based on the English language. It is to be recognized that the invention may be practiced with characters of other languages as well.

One skilled in the art will recognize that the present invention may be practiced with respect to various keyboard layouts, such as a QWERTY keyboard layout, Dvorak keyboard layout or any configuration of characters and symbols that facilitate text entry for a given language or languages. Moreover, while the present invention may be described with respect to an improvement over miniaturized keyboards, the present invention may be practiced with standard-sized keyboards in an attempt to enhance their functionality as well.

Figure 1:
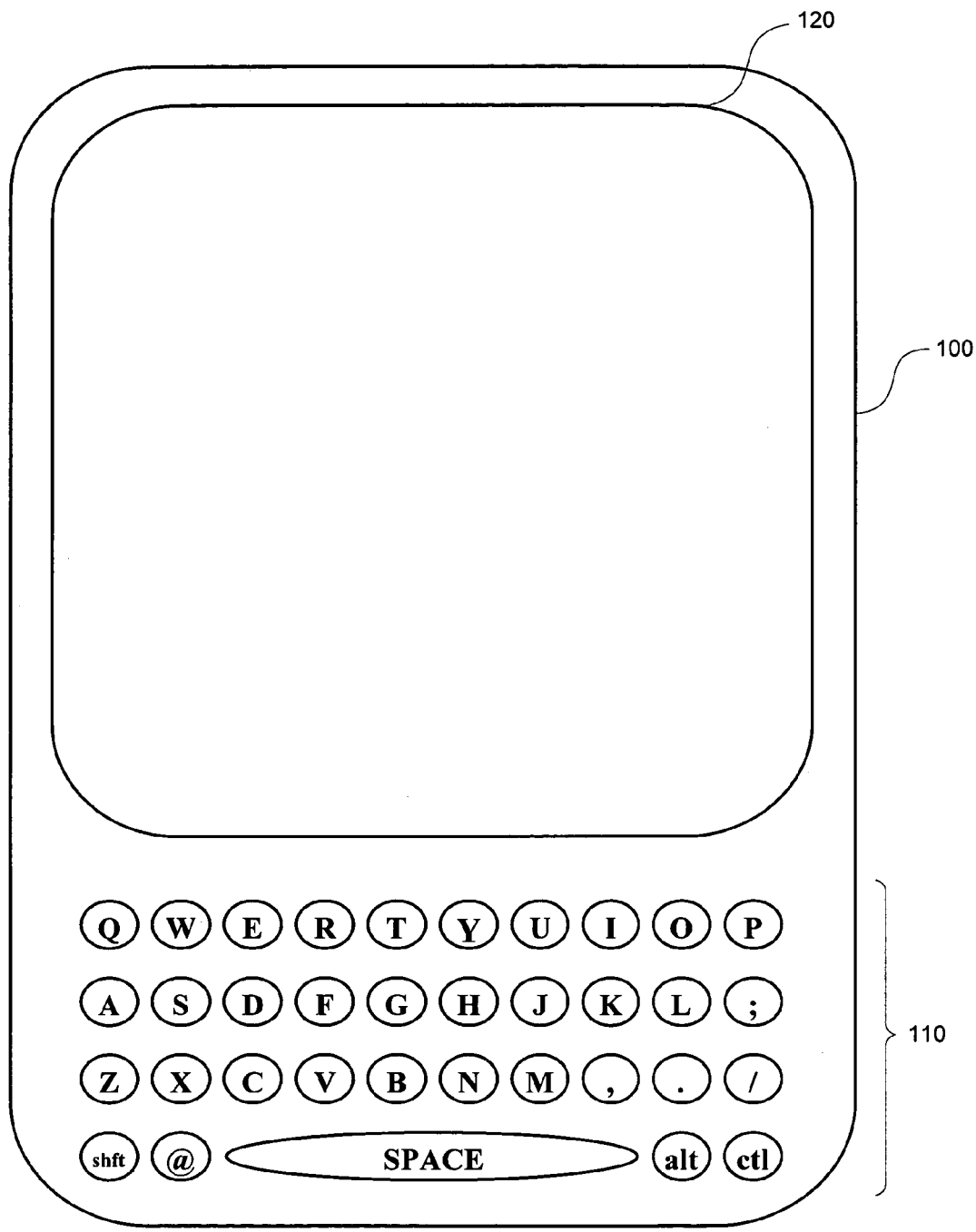
FIG. 1 illustrates a prior art, mobile electronic device including a miniaturized QWERTY keyboard for inputting data.

FIG. 1 illustrates an example prior art portable electronic device 100 utilizing a miniaturized QWERTY keyboard 110 for inputting data. Note that a relatively large display 120 leads to a reduced amount of surface area available for an input keyboard such as miniaturized QWERTY keyboard 110. In contrast to standard QWERTY keyboards in use with desktop and larger computers, miniaturized QWERTY keyboards on portable electronic devices typically have a limited key set. Furthermore, if the QWERTY keyboard has numeric values, the values will frequently be located along the top row of keys, which may be awkward for entry of telephone numbers and the like. Competing interface requirements on the keyboard have resulted in a reduction in input key size as well as a reduction in spacing between input keys. Frequently, users will activate input keys inadvertently due to the close proximity and size of the input keys. This affects the ability of a user to input data to electronic device 100.

Figure 2:
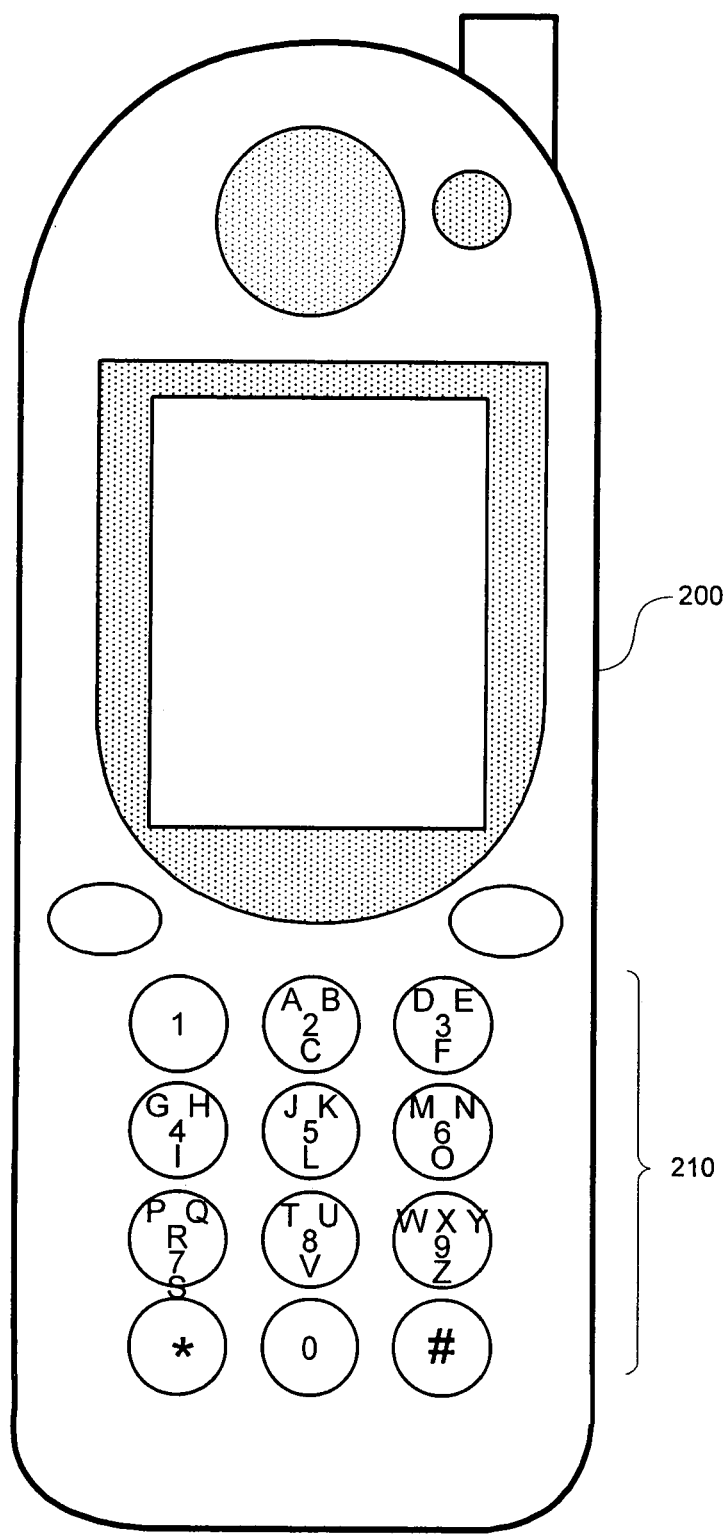
FIG. 2 illustrates a prior art, mobile telephone device including a conventional telephone keypad for inputting data.

Other mobile devices include simply a conventional telephone keypad. FIG. 2 shows an example prior art keypad 210 on a mobile telephone device 200. As mentioned previously, one method for entering alphabetic values or letters via a telephone keypad 210 is generally known as multi-tap. In order for a user to enter text using multi-tap, a letter is selected by repeatedly activating a corresponding input key until the desired letter appears. For example, a user may activate the input key associated with the numeric value "2" once for "a", twice for "b" or three times for "c." Thus, traditional multi-tap requires multiple activations of a single input key in order to enter a letter.

Another method used for entering text on mobile telephone device 200 may include predictive text entry (T9 Text Input™). Using predictive text entry, a user activates each key only once to enter each letter of a key sequence representing a word. Software may then produce a list of word possibilities for the particular key sequence. If the desired word is correctly "predicted", the user then selects it from the list.

Figure 3:
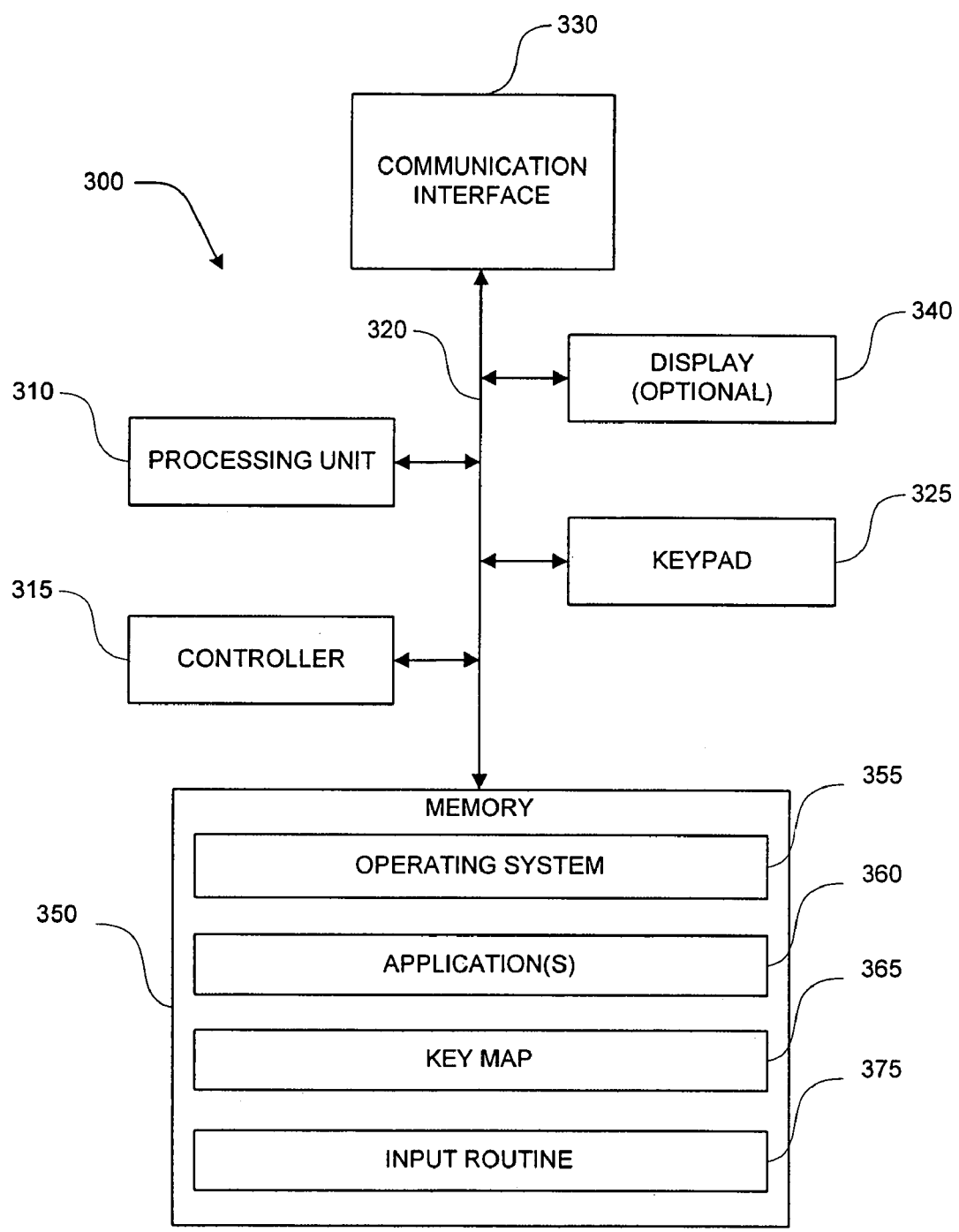
FIG. 3 illustrates a block diagram view of a computing environment, in accordance with an embodiment.

Referring now to FIG. 3, wherein an exemplary electronic device 300 suitable for use in embodiments of the present invention is shown. Those of ordinary skill in the art and others will appreciate that electronic device 300 may include many more components than those shown in FIG. 3. However, it is not necessary that all of these generally conventional components be shown in order to disclose an enabling embodiment for practicing the present invention. As shown in FIG. 3, electronic device 300 includes an optional (wire line based or wireless) communications interface 330 for connecting to remote device(s) (not shown). Communications interface 330 includes the necessary circuitry, driver and/or transceiver for such a connection and is constructed for use with the appropriate protocols for such a connection.

Electronic device 300 contains a reduced keypad 325 for providing input to electronic device 300. In accordance with the present invention, each input key on reduced keypad 325 is associated with one or more alphabetic and/or numeric values. Electronic device 300 also includes a processor or processing unit 310, a controller 315, a display 340, and a memory 350, all interconnected along with the communications interface 330 via a bus 320. Memory 350 generally comprises random access memory ("RAM"), a read only memory ("ROM") and a non-volatile mass storage device, such as a flash memory or the like. Memory 350 stores an operating system 355, a key map 365, and an input method routine 375 formed in accordance with embodiments of the present invention. In an embodiment, input method routine 375 may include an input routine associated with a multi-tap input routine, a predictive text input routine, or both.

In various embodiments, memory 350 also stores application(s) 360. It will be appreciated by those of ordinary skill in the art and others, that while key map 365, input routine 375 and applications 360 are described as separate individual software components, they may actually be combined, comprised of multiple software components; or may in fact be sub-parts of one or more integrated software components. In particular, input routine 375 may be integrated with applications 360 or operating system 355. Additionally, while key map 365 and input routine 375 are illustrated as software components (e.g., part of the operating system, or a discrete application), in alternate embodiments, they may be hardware components of electronic device 300.

It will be appreciated that the software components may be loaded from a computer readable medium into memory 350 of the host computer or electronic device 300 using a drive mechanism (not shown) or network mechanism (not shown) associated with the computer readable medium, such as a floppy, tape, DVD/CD-ROM drive, flash RAM, network interface card, or communications interface 330.

Further, communication interface 330 may be designed to support one or more signaling protocols, including but not limited to Code Division Multiple Access ("CDMA"), Time Division Multiple Access ("TDMA"), Global System for Mobile Communications ("GSM"), General Packet Radio Service ("GPRS") and so forth. Moreover, communication interface 330 may be implemented using a separate transmitter and receiver.

"Activation" means an affirmative action by a user to provide a value associated with a key as input to the electronic device. Key activations may include a traditional mechanical key that, when pressed, causes the key to contact a switch on a circuit board located beneath the key. Alternatively, key activations may mean the touching by a user (or stylus) of a pressure sensitive key or a capacitive or resistive touch sensitive surface, as well as on "soft" keys on a touch-sensitive display.

Figure 4:
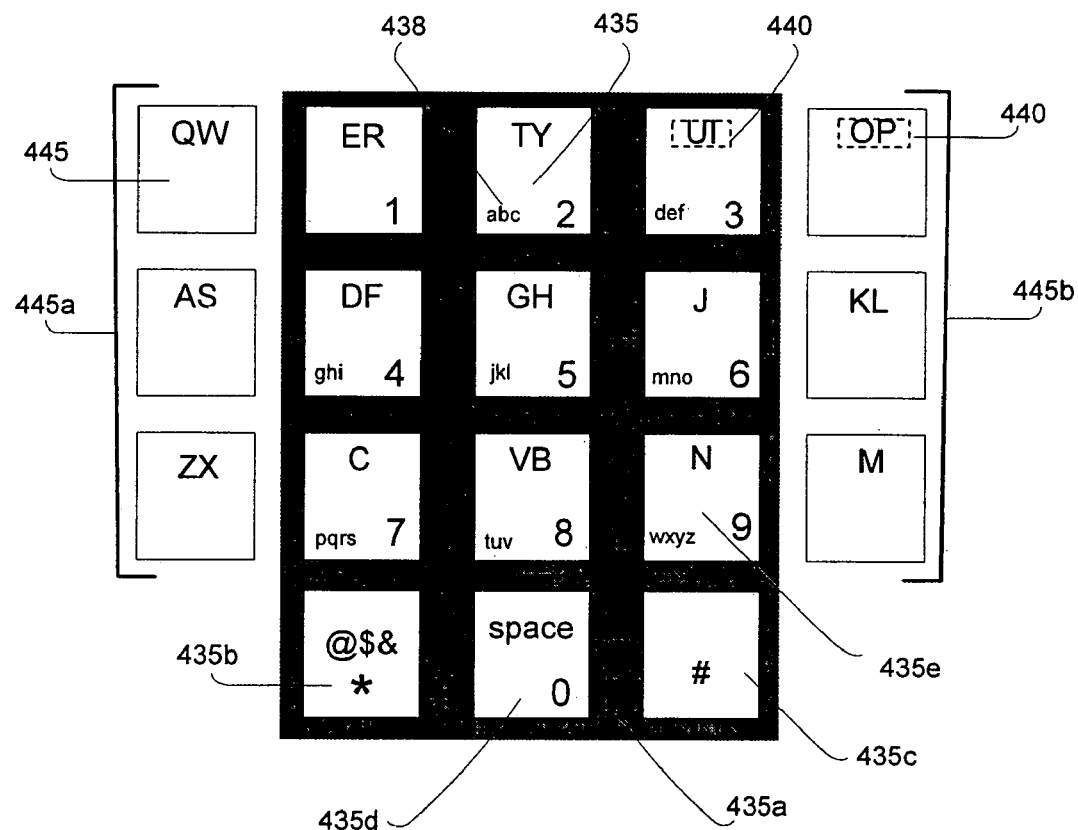
FIG. 4 illustrates an example of a reduced keypad in accordance with an embodiment.

FIG. 4 illustrates a top view of a reduced keypad 425 according to an embodiment. For the illustrated embodiment, reduced keypad 425 may be arranged in four rows and include a first plurality of input keys 435 (indicated in shaded area 435a) partially surrounded by a second plurality of input keys 445 (indicated by reference lines 445a and 445b). For the embodiment, at least some of first plurality of input keys 435 may be associated with a numeric value 0–9 and a first set of alphabetic values 438 to form a telephone keypad layout based on the first plurality of input keys' numeric values and respective first sets of alphabetic values. Each of the input keys of the first and second plurality of input keys 435 and 445 may be associated with one or more non-alphabetic or non-numeric character values as well. Thus, as illustrated, the bottom row of first plurality of input keys 435 may also include input keys 435b and 435c associated with at least an asterisk and a pound symbol, respectively.

In the illustrated embodiment, at least some of first plurality of input keys 435 and second plurality of input keys 445 may be associated with a second set of alphabetic values 440, located on an upper portion of the input keys. In contrast to each of first sets of alphabetic values 438, which may include one or more alphabetically ordered letters, each of second sets of alphabetic values 440 may include one or more letters arranged to be compatible with a second alphabetic keypad layout. For the embodiment, the second alphabetic keypad layout may include any standard or non-standard keyboard layout that may be conducive for user entry of text. Thus, in the illustrated embodiment, each of first plurality of input keys 435 may be arranged relative to each of adjacent or partially surrounding second plurality of input keys 445 to form a QWERTY keyboard layout. Note also that in the embodiment, and as described above, at least one set from the first or second sets of alphabetic values 438 and 440 comprises a single alphabetic letter or value. For example, in the embodiment, input key 435*e* is associated with a second set of alphabetic values 440 comprising the single alphabetic value 'N.'

Note that for clarity, only one input key 435, one input key 445, one set of alphabetic values 438, and one set of second set of alphabetic values 440 have been labeled in the figure. Furthermore, please note that in the embodiment shown, although input keys 445 may include two groups of keys substantially disposed on a left and a right side of input keys 435, in alternate embodiments, second plurality of input keys 445 may be disposed at other suitable locations relative to first plurality of input keys 435 to facilitate the formation of the second alphabetic keypad layout. In the illustrated embodiment, the second alphabetic keypad layout comprises a QWERTY keyboard layout. In another embodiment, the second alphabetic keypad layout may comprise a Dvorak keyboard layout. The embodiments are in no way limited, however, to standard keyboard layouts and suitable layouts formed together by first and second plurality of input keys 435 and 445 may include any non-standard keyboard layout in an attempt to allow users of electronic devices to easily enter text.

Additionally, as noted previously, in various embodiments, first plurality of input keys 435 or second plurality of input keys 445 may include one or more input keys associated with one or more non-alphabetic or non-numeric values. Examples of such associated values include but are not limited to, punctuation marks, special symbols or characters, device commands or other suitable value. In one embodiment, device command values may include function keys, cursor-control keys, or modifier keys. For example, as referenced above and shown in the FIG. 4, input keys 435*b* and 435*c*, may include an asterisk or pound symbol on a lower portion of the respective keys. In the illustrated embodiment, input key 435*b* further includes symbols, "@" "$" and "&" while input key 435*c* further includes a device command value of "select." As another example, in the embodiment shown, first plurality of input keys 435 includes an input key 435*d* associated with device command value of 'space bar' as well as numeric value "0".

Note also that although in FIG. 4, each of first and second sets of alphabetic values 438 and 440, the numeric values, and non-alphabetic and non-numeric values are displayed on particular portions of the input keys (i.e., upper, lower, central portions), in alternate embodiments, the values may be displayed on varying portions of input keys. Also, note that in alternate embodiments, input keys of the first and second plurality of input keys 435 and 445 may be associated with more or fewer values and are not limited to the specific associated values as shown in FIG. 4. Furthermore, in one embodiment, input keys 435 and 445 may include input keys rendered on a display, such as, a liquid crystal display (LCD).

In one embodiment, there may be a toggle button or an input key for activation of a telephone keypad mode or second alphabetic keypad layout mode for textual input. Thus, in the illustrated embodiment, a user may input data using a QWERTY layout for textual input and a telephone keypad for entry of telephone numbers and the like. For a user to input data into electronic device 300, in an embodiment, reduced keypad 425 may be used with a multi-tap mode of entry. Thus, in one embodiment, a particular numeric value, an alphabetic value from first set 438, or an alphabetic value from second set 440 may be selectable based on a number of key activations applied to a corresponding input key within a specified time period. Thus, in one embodiment, key map 365 maps a combination of one or more key activations and an input key to a corresponding character or alphabetic value of first and second sets of alphabetic values 438 and 440. In other embodiments, a predictive text mode of entry may be used for text entry, in either a second alphabetic keypad layout mode for textual input mode or a telephone keypad mode.

Figure 5:
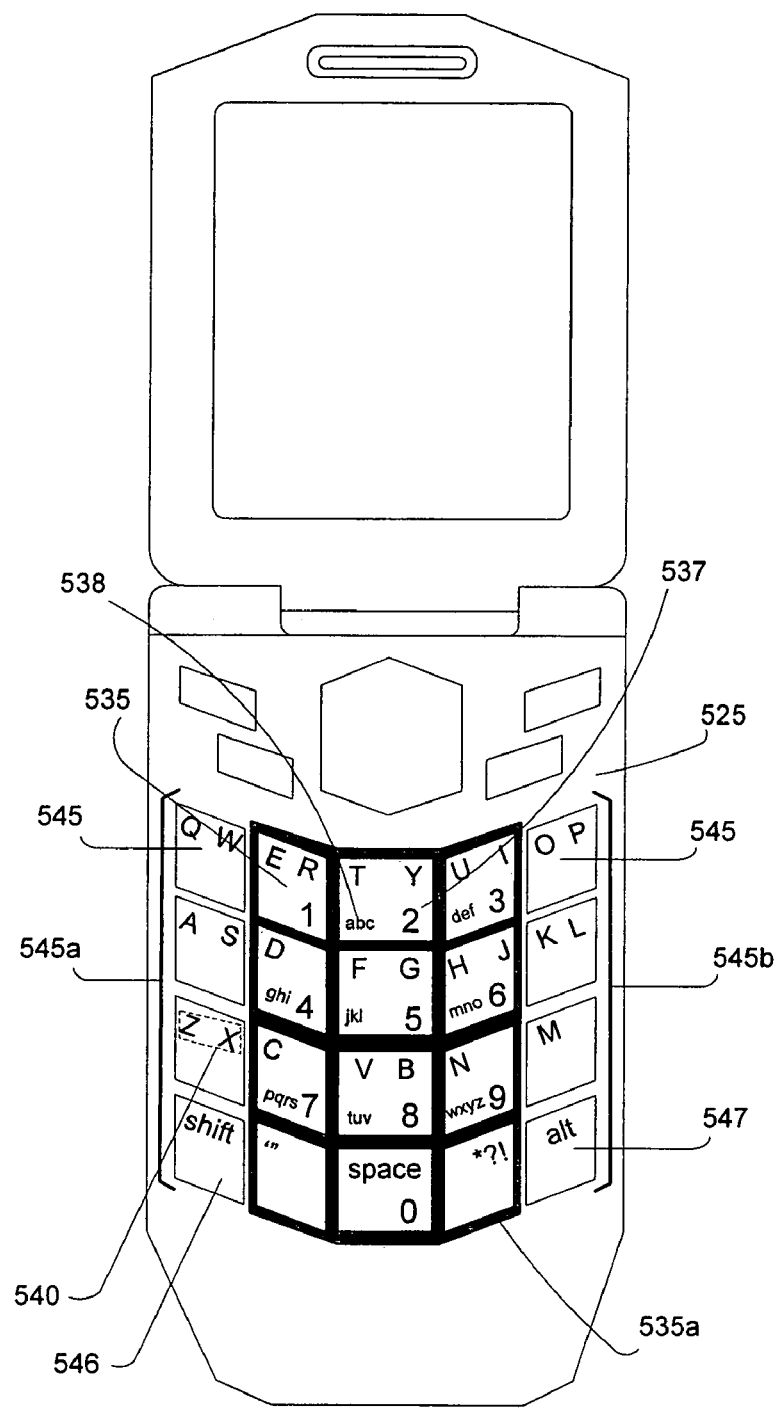
FIG. 5 illustrates a mobile electronic device having a reduced keypad in accordance with an embodiment.

FIG. 5 illustrates an example electronic device 500 including a reduced keypad 525 according to one embodiment. In various embodiments, electronic device 500 may be a cellular phone, PDA cellular phone or other mobile electronic device. For the embodiment, electronic device 500 includes a first plurality of input keys 535, each of first plurality of input keys 535 associated with at least one numeric value and at least one alphabetic value and arranged in a numeric and first alphabetic telephone keypad arrangement.

Thus, in the illustrated embodiment, each of first plurality of keys 535 (indicated in shaded area 535*a*) may be a numeric key associated with a unique number or numeric value 537. Input keys having numeric values 2–9 of first plurality of keys 535 may be associated with a first set of alphabetic values 538, each set having approximately three or four alphabetically ordered letters, in accordance with the embodiment. Thus, more specifically, in one embodiment, as illustrated in FIG. 5, the following ordered groups of first sets of alphabetic values 538 correspond to their respective numeric key: abc—2 key, def—3 key, ghi—4 key, jkl—5 key, mno—6 key, pqrs—7 key, tuv—8 key, wxyz—9 key. Thus, in an embodiment, correspondence between each of the numeric keys and alphabetically ordered letters of first sets of alphabetic values 538 is substantially the same as the correspondence between each of the numeric keys and letters of a conventional telephone keypad.

Furthermore, in an embodiment, each of the alphabetically ordered letters of first sets of alphabetic values 538 corresponds to a DTMF signal substantially consistent with a DTMF signal corresponding to the alphabetically ordered letters of a conventional telephone keypad layout. This may allow mnemonic phone numbers, such as 1-800-FLOWERS, and the like, to be entered in the same manner as on a conventional telephone keypad because the correspondence between each letter and numeric key is compatible.

In a similar manner to keypad 425 of FIG. 4, a second plurality of input keys 545 may be positioned adjacent to or partially surrounding first plurality of input keys 535. Second plurality of input keys 545 may include 2 groups of keys substantially disposed on a left and a right side of first plurality of input keys 535 as indicated by reference lines 545*a* and 545*b*, respectively. At least some of first plurality of input keys 535 and second plurality of input keys 545 may be associated with a second set of alphabetic values 540. In an embodiment, each of first plurality of input keys 435 may be arranged relative to each of partially surrounding second plurality of input keys 545 to form an alphabetic arrangement different from the alphabetic keyboard arrangement of a telephone keypad. In one embodiment, a keyboard layout suitable for user entry of text may be formed. In the illustrated embodiment, such a keyboard includes a QWERTY keyboard layout.

Note that for clarity in the figure, only one input key 535, one input key 545, one set of alphabetic values 538, and one set of second set of alphabetic values 540 have been labeled. Further note that second plurality of input keys 545 includes an input key 546 associated with a value "SHIFT" and an input key 547 associated with a value "ALT". Thus, in one embodiment keypad 525 includes a total of 20 input keys, rather than 18 input keys as shown in keypad 425. Thus, as illustrated, electronic device 500 includes a mobile communication device or mobile electronic device. In one embodiment, the device may include a communication interface to facilitate communication with a communication station of a wireless network service provider.

Additionally, note that in the embodiment, reduced keypad 525 of FIG. 5 has been advantageously and ergonomically designed to arrange first and second plurality of input keys 535 and 545 in a plurality of non-linear rows to form substantially a V-shape. The illustrated arrangement attempts to provide convenient access to the input keys by reducing strain on users' thumbs that may be caused by prior art keypad arrangements. When cradling electronic device 500 from the sides, the natural arcs of a user's thumbs create a "v" shaped region of movement.

Figure 6:
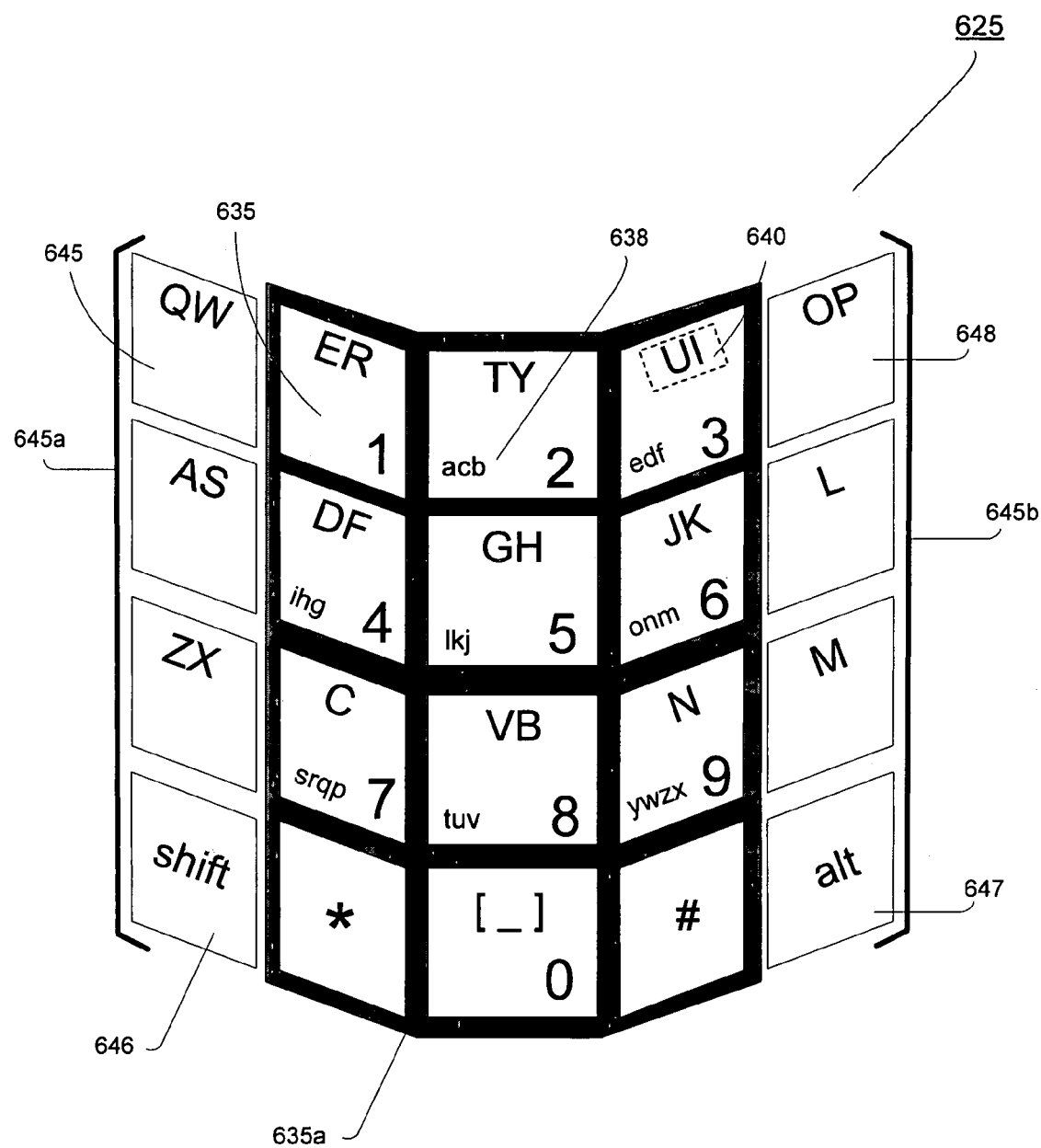
FIG. 6 illustrates an example of a reduced keypad in accordance with an embodiment.
Figure 7:
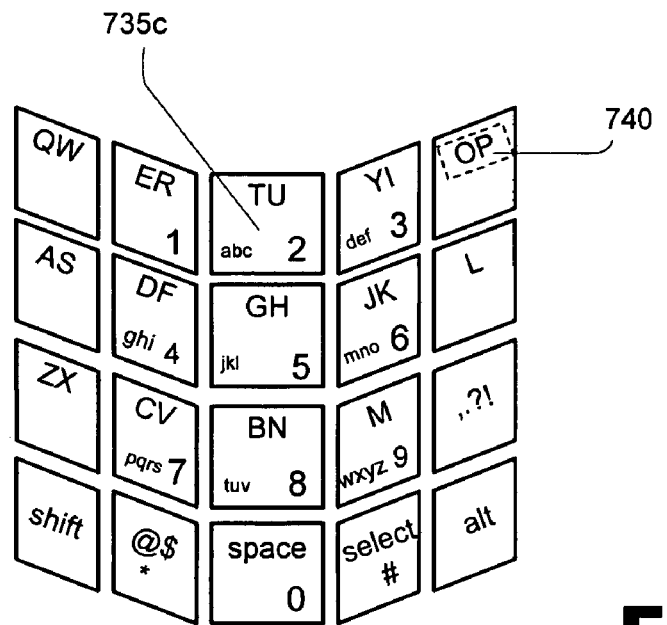
FIG. 7 illustrates an example of a reduced keypad in accordance with an embodiment.
Figure 8:
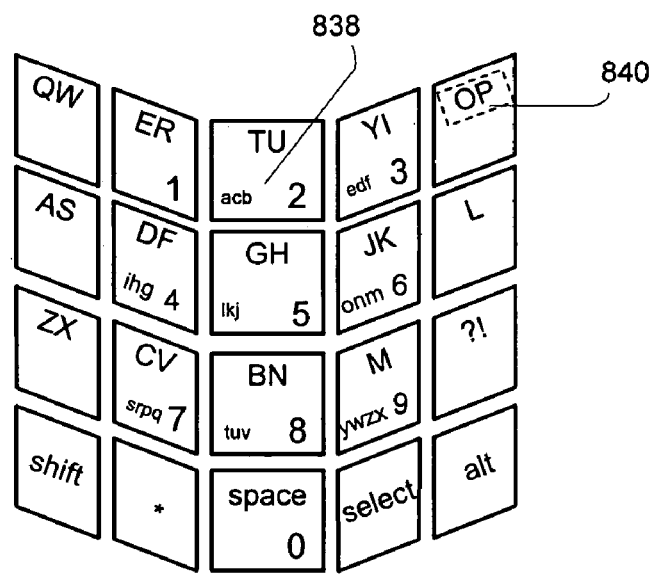
FIG. 8 illustrates an example of a reduced keypad in accordance with an embodiment.

FIGS. 6, 7 and 8 illustrate reduced keypad arrangements according to further embodiments. The figures illustrate a top view of a keypad 625, 725, and 825, respectively, having a first and a second plurality of input keys. At least some of the first plurality of input keys may be assigned a numeric value and a first set of alphabetic values to form a telephone keypad layout based on their numeric values and respective first sets of alphabetic values. In the various embodiments, a second plurality of input keys may be positioned adjacent to or partially surrounding the first plurality of input keys and may be disposed relative to the first plurality of input keys in a manner to form a second alphabetic arrangement. Input keys may be associated with one or more non-alphabetic or non-numeric values as well.

FIG. 6 illustrates an embodiment wherein first sets of alphabetic values 638 includes groups or sets of letters having an order on some input keys based on a frequency of occurrence of the letters, rather than alphabetically ordered as in keypad 425 of FIG. 4. A telephone keypad including such an arrangement is further described in U.S. Pat. No. 6,643,371 (hereinafter '371 patent), filed Aug. 31, 2001. For the embodiment, letter-to-key correspondence matches a standard letter-to-key correspondence as illustrated in FIG. 4, but within a group of letters, letters with a higher frequency of use are positioned before letters with a lower frequency of use.

Such an embodiment may be advantageous when using multi-tap entry. Thus, the letters having a higher probability of occurrence are selected by a single activation of the input key and letters with a lower probability of occurrence are selected by activating the input key two or more times. For example, as illustrated in FIG. 4, the input key associated with numeric value "2" has an associated first set of alphabetic values 638 of "acb," rather an "abc." In the embodiment, a standard correspondence between numeric input keys and letters of the alphabet is maintained for compatibility when entering mnemonic phone numbers and generating DTMF signals.

FIG. 7 provides an embodiment wherein a second set of alphabetic values 740 may include alphabetic values arranged in a "Quasi-QWERTY" keyboard layout, similar to a layout described in more detail in copending and contemporaneously filed PCT application PCT/US05/05013, "Reduced Keypad for Predictive Input". In one embodiment, second set of alphabetic values 740 may be arranged to reduce multiple word matches during predictive text input by a user. Thus, in the illustrated embodiment, input key 735c includes a 'TU', rather than a 'TY' of the QWERTY keyboard arrangement of FIG. 4. In alternative embodiments, other variations of a modified QWERTY or Quasi-QWERTY keyboard arrangement may also reduce multiple word matches while maintaining a key arrangement substantially familiar to users.

FIG. 8, like FIG. 7, provides an embodiment wherein a second set of alphabetic values 840 may include letters ordered in a substantially Quasi-QWERTY keyboard layout. In the embodiment shown in FIG. 8, however, first sets of alphabetic values 838 may include sets of letters having an order on each input key at least partially based on a frequency of occurrence of the letters (as shown in FIG. 6 and the '371 patent) rather then sets of letters in consecutive alphabetical order.

Figure 9:
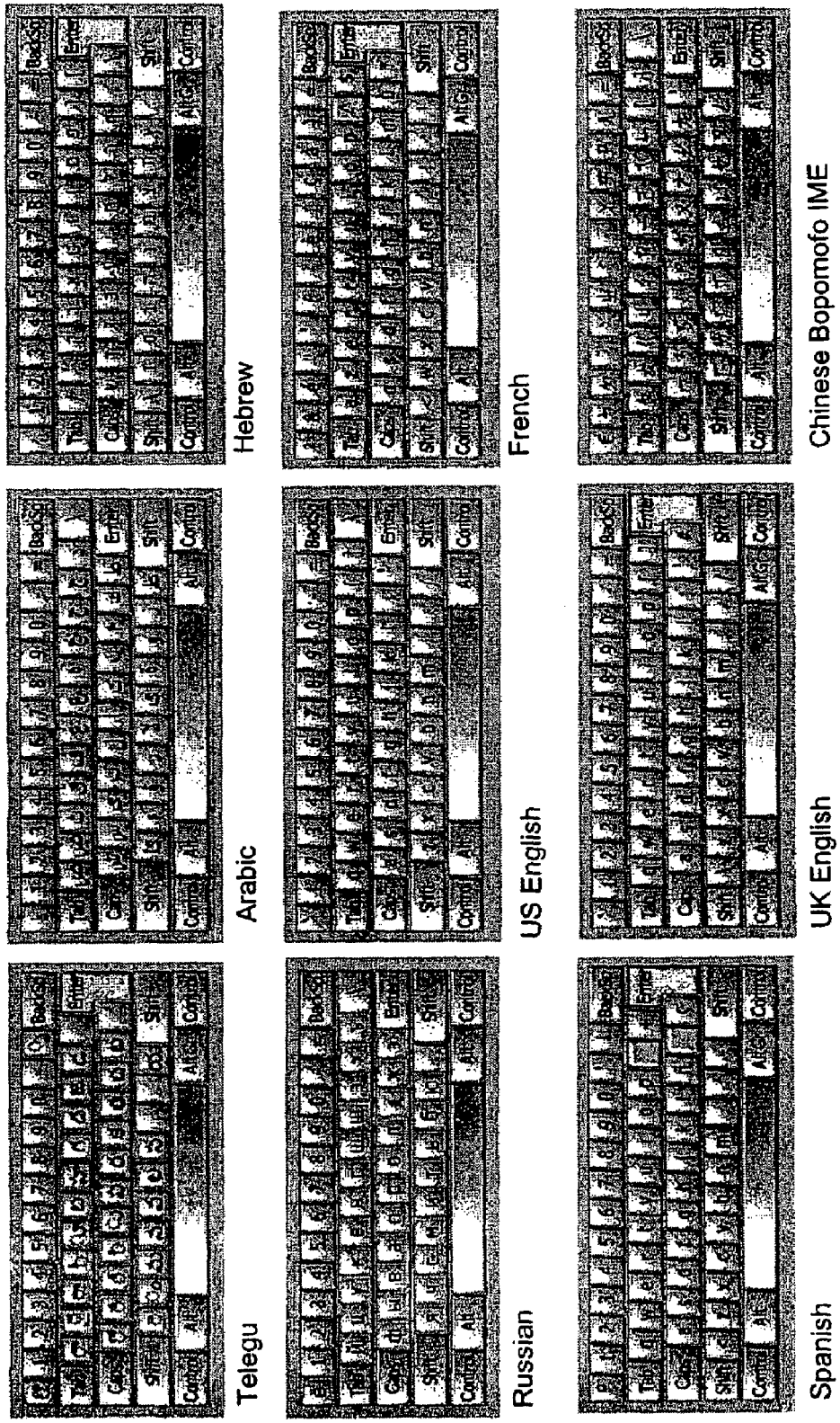
FIG. 9 illustrates six exemplary non-English language keyboard layouts that may be implemented in a reduced manner in accordance with embodiments of the invention.

FIG. 9 illustrates six exemplary non-English language keyboard layouts that may be implemented in a reduced manner in accordance with embodiments of the invention. Illustrated from left to right and top to bottom, are keyboard layouts for the languages, Telegu, Hebrew, Russian, French, Spanish and Chinese. The present invention anticipates keypads that may be implemented from these and other similar keyboards in the reduced manner as earlier described for the English QWERTY or modified English QWERTY keyboard.

Thus, it can be seen from the above descriptions, a reduced keypad having dual alphabetic sets has been described for use on a mobile electronic device. In one embodiment, there may be a toggle button or an input key for activation of a keyboard layout for textual input mode or a telephone keypad mode. In various embodiments, reduced keypad 425 may be used with a multi-tap mode of entry or a predictive text mode of entry.

Those of ordinary skill in the art will appreciate that the exemplary keyboard layouts shown in FIG. 9 as well as the exemplary keypads 425, 525, 625, 725 and 825 are shown by way of illustration and are not meant to limit the scope of the present invention.

It will be appreciated that although particular embodiments of the invention have been described in detail, various modifications and improvements can be made by a person skilled in the art without departing from the scope of the present invention. It will also be appreciated that the frequency of use of letters varies in situations where users predominately use languages other than English, or where geographical or cultural differences result in different word corpuses of use. In these situations, ordered sets other than those explicitly described, in accordance with the present invention, may be desirable.

What is claimed is:

1. An apparatus, comprising:
  a body;
  a first plurality of input keys disposed on the body, at least some input keys of the first plurality of input keys being associated with both a numeric value and a first set of alphabetic values, at least some of the input keys of the first plurality of input keys being arranged in a first alphabetic keypad layout based on their respective first sets of alphabetic values; and
  a second plurality of input keys disposed on the body, and positioned adjacent to the first plurality of input keys, at least some input keys of the second plurality of input keys being associated with at least one alphabetic value, at least some of the input keys of the second plurality of input keys being arranged in a second alphabetic keypad layout different from the first alphabetic keypad layout and wherein at least some input keys of the first plurality of input keys have a second set of alphabetic values that is used as part of the second alphabetic keypad layout.

2. The apparatus of claim 1, wherein the first alphabetic keypad layout corresponds to a numeric and alphabetic telephone keypad layout and wherein each of the respective first sets of alphabetic values comprises a first set of alphabetically ordered letters.

3. The apparatus of claim 2, wherein each of the alphabetically ordered letters corresponds to a DTMF signal consistent with a DTMF signal corresponding to a respective each of alphabetically ordered letters of a conventional telephone keypad layout.

4. The apparatus of claim 2, wherein each of the first plurality of input keys is a numeric key associated with a unique number and the correspondence between each of the numeric keys and the alphabetically ordered letters of the first set of alphabetic values is the same as the correspondence between each of the numeric keys and letters of a conventional telephone keyboard.

5. The apparatus of claim 1, wherein the at least some input keys associated with both a numeric value and a first set of alphabetic values is associated with a set of alphabetic values selected from a set A,B,C, a set D,E,F, a set G,H,I, a set J,K,L, a set M,N,O, a set P,Q,R,S, a set T,U,V, and a set W,X,Y,Z.

6. The apparatus of claim 1, wherein the second alphabetic keypad layout comprises a standard keyboard layout.

7. The apparatus of claim 1, wherein the second alphabetic keypad layout comprises any non-standard keyboard layout.

8. The apparatus of claim 1, wherein the second alphabetic keypad layout comprises a QWERTY keyboard layout or a Dvorak keyboard layout.

9. The apparatus of claim 1, wherein at least one set from the first or second sets of alphabetic values comprises a single alphabetic value.

10. The apparatus of claim 1, wherein a particular numeric value, an alphabetic value from the first set, or an alphabetic value from the second set is selectable based on a number of key activations applied to a corresponding input key.

11. The apparatus of claim 1, further comprising a processor to receive a signal corresponding to an activation at one of the first and the second plurality of input keys to process a predictive text routine.

12. The apparatus of claim 1, wherein the apparatus is a keyboard for use on a portable electronic device.

13. The apparatus of claim 1 wherein the apparatus is a portable electronic device.

14. The apparatus of claim 1, wherein the apparatus is a wireless mobile communication device, including a wireless communication interface to facilitate wireless communication with a communication station of a wireless network service provider.

15. The apparatus of claim 1, wherein the first alphabetic keypad layout corresponds to a numeric telephone keypad layout and wherein each of the respective first sets of alphabetic values comprises a first set of letters wherein letters with a higher frequency of use are positioned before letters with a lower frequency of use.

16. An apparatus, comprising:
a body;
a first plurality of input keys disposed on the body, each of the first plurality of input keys associated with at least one numeric value and at least one alphabetic value and arranged in a numeric and first alphabetic telephone keypad arrangement;
a second plurality of input keys disposed on the body, and at least partially surrounding the first plurality of input keys from at least two sides, at least some of the second plurality of input keys associated with at least one alphabetic value and wherein input keys of the first and the second plurality of input keys are arranged relative to each other to form a second alphabetic arrangement; and
a processor, coupled to the first and the second plurality of input keys to detect one or more key activations at the first or the second plurality of input keys, the one or more key activations corresponding to a selection of one or more of the associated alphabetic or numeric values.

17. The apparatus of claim 16, wherein the first alphabetic telephone keypad arrangement corresponds to an alphabetic telephone keypad arrangement of approximately three or four alphabetically ordered letters associated with at least some of the first plurality of input keys.

18. The apparatus of claim 17, wherein each of the at least some of the first plurality of input keys are associated with at least one of the numeric values 0, 2, 3, 4, 5, 6, 7, 8, and 9.

19. The apparatus of claim 16, wherein the first and second plurality of input keys are arranged in a plurality of non-linear rows to form substantially a v-shape.

20. The apparatus of claim 16, wherein the second alphabetic arrangement comprises a standard keyboard layout including but not limited to a QWERTY keyboard layout.

21. The apparatus of claim 16, wherein the second alphabetic arrangement comprises a modified QWERTY or non-standard keyboard arrangement.

22. The apparatus of claim 16, wherein the at least one of the first and second plurality of input keys is associated with a non-alphabetic or non-numeric value.

23. The apparatus of claim 22, wherein the at least one of the first and second plurality of input keys corresponds to at least one of a punctuation key, a function key or a cursor-control key.

24. The apparatus of claim 22, wherein the non-alphabetic value corresponds to an ampersand, asterisk or a pound sign.

25. The apparatus of claim 16, wherein the first and second plurality of input keys include input keys rendered on a display.

26. An apparatus, comprising:
four rows of data entry keys, each of the four rows including a plurality of keys wherein each of the keys in at least three rows is assigned a set of characters from a plurality of sets, each of the sets including at least one character;
wherein of five keys of a firs row is correspondingly assigned the set Q,W, the set E,R, the set T,U, the set I,Y, and the set O,P, each of five keys of a second row is correspondingly assigned the set A,S, the set D,F, the set G,H, the set J,K, and the set L, and each of four keys of a third row is assigned the set Z,X, the set C,V, the set B,N, and the set M; and
a controller including a key map, the key map to map a combination of one or more key activations and a data entry key to a corresponding character included in the plurality of sets of characters.

27. The apparatus of claim 26, wherein some of the keys in the plurality are further assigned a second set of characters from a second plurality of sets, each of the sets including letters in consecutive alphabetic order.

28. The apparatus of claim 26, wherein each of the keys in the plurality assigned a second set of characters is a numeric key, and wherein the correspondence between each of the numeric keys and second sets of characters is substantially the same as the correspondence between each of the numeric keys and letters on a conventional telephone keyboard.

* * * * *